Jan. 2, 1923. 1,440,974
W. H. DORNBURGH.
TIRE.
FILED JAN. 27, 1922. 2 SHEETS-SHEET 1
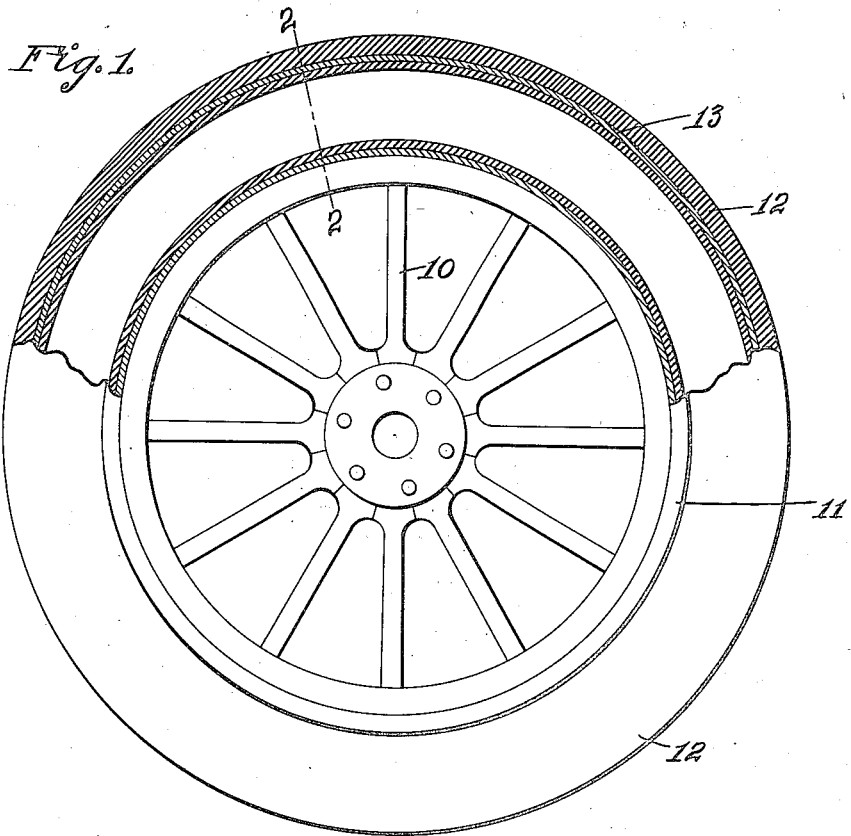
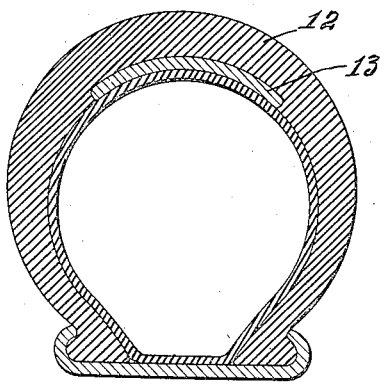
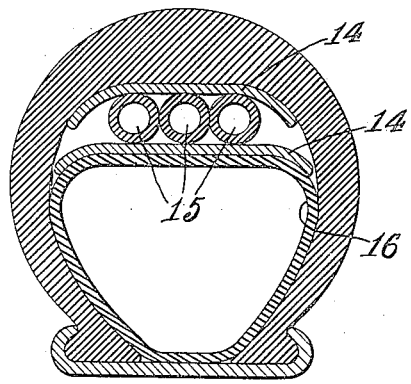
William H. Dornburgh
INVENTOR
BY Victor J. Evans
ATTORNEY
WITNESS:

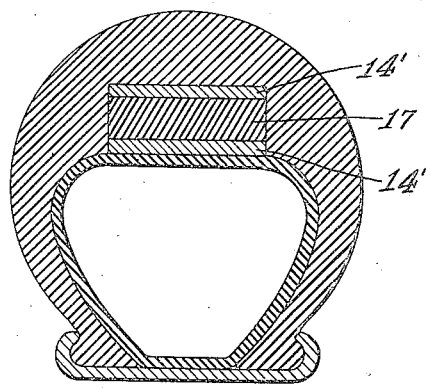
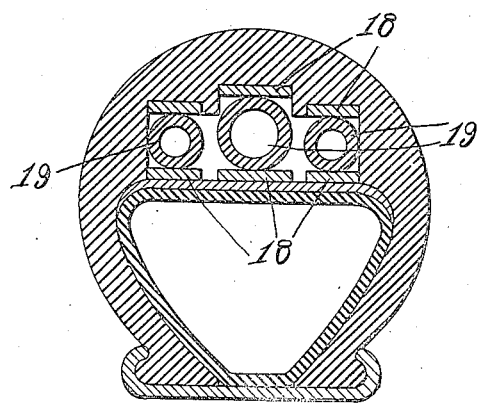
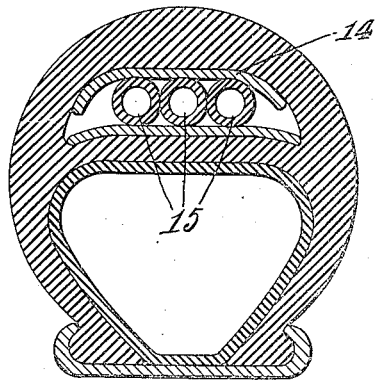

Patented Jan. 2, 1923.

1,440,974

UNITED STATES PATENT OFFICE.

WILLIAM H. DORNBURGH, OF SCHENECTADY, NEW YORK.

TIRE.

Application filed January 27, 1922. Serial No. 532,303.

*To all whom it may concern:*

Be it known that I, WILLIAM H. DORNBURGH, a citizen of the United States, residing at Schenectady, in the county of Schenectady and State of New York, have invented new and useful Improvements in Tires, of which the following is a specification.

This invention relates to improvements in vehicle tires especially designed for use upon automobiles.

An object of the present invention is the provision of means for holding the tire or shoe extended without the use of the usual inner tube, although the latter may be used if desired, while the means employed also act to protect the tube against puncture in the event of the use of the tube.

With the above and other objects in view, the invention further includes the following novel features and details of construction, to be hereinafter more fully described, illustrated in the accompanying drawings and pointed out in the appended claims.

In the drawings:—

Figure 1 is a side elevation of a wheel with the tire in position thereon, the latter being partly broken away and shown in section.

Figure 2 is an enlarged transverse sectional view through the tire and the adjacent portion of a wheel.

Figure 3 is a similar view of a modified form of tire.

Figures 4, 5 and 6 are like views of still other modified forms.

Referring to the drawings in detail and especially to Figures 1 and 2, the reference character 10 indicates a wheel of any prefered construction, but which is adapted to receive the usual demountable rim 11 of the character used in connection with the ordinary pneumatic tire. This rim may be either the straight side or clincher type, the latter being preferred.

The tire which includes the ordinary shoe or casing 12 has secured upon its inner surface an annular metallic band or ring 13 formed of resilient material. This acts to prevent the tire from collapsing and provides a resilient support whose thickness or resilient quality may be determined by the use for which the tire is intended.

If desired, the usual pneumatic tube may be used in connection with the tire, or a tire of the form shown in the remaining figures of the drawing may be provided. In Figure 3 there is secured within the shoe or casing 12, a pair of spaced annular resilient bands 14. These bands are spaced apart by means of annular compressible members shown in the form of tubes 15. This increases the resiliency of the tire by providing for a relative movement between the spaced annular bands 14. The usual inner tube 16 may be used to add further cushioning effect.

In Figure 4, the spaced annular bands 14' are held apart by a solid rubber spacing member 17, which may be of annular formation if desired.

In Figure 5 the construction provides a plurality of relatively narrow spaced annular resilient bands 18, which are spaced apart by compressible tubes 19, the central tubes and spaced bands 18 being of a slightly larger diameter than the side tubes and bands. The tubes and bands 18 and 19 may be embedded in the tread of the tire as shown, or, the construction shown in Figure 3 may be arranged within the tire tread in the manner illustrated in Figure 6 of the drawings.

The invention is susceptible of various changes in its form, proportions and minor details of construction and the right is herein reserved to make such changes as properly fall within the scope of the appended claims.

Having described the invention what is claimed is:—

1. The combination with a pneumatic tire having an inner tube and including a casing having a relatively thick tread and an annular space within the tread, of inner and outer spaced metallic rings located within the annular space, an annular compressible element located between said rings and means located between the metallic members and inner tube to prevent contact therebetween.

2. The combination with a tire casing including a relatively thick tread and having an annular space within the tread, of inner and outer spaced metallic rings located within the annular space and a plurality of compressible tubular rings located between said metallic rings.

In testimony whereof I affix my signature.

WILLIAM H. DORNBURGH.